United States Patent
Bhattacharjya

(10) Patent No.: US 7,430,060 B2
(45) Date of Patent: Sep. 30, 2008

(54) FAST LOW-MEMORY PAPER COLOR SUPPRESSION ALGORITHM

(75) Inventor: Anoop K. Bhattacharjya, Campbell, CA (US)

(73) Assignee: Seiko Epson Corporation, Tokyo (JP)

(*) Notice: Subject to any disclaimer, the term of this patent is extended or adjusted under 35 U.S.C. 154(b) by 760 days.

(21) Appl. No.: 10/963,254

(22) Filed: Oct. 12, 2004

(65) Prior Publication Data

US 2006/0077406 A1    Apr. 13, 2006

(51) Int. Cl.
*H04N 1/60* (2006.01)
*G03F 3/08* (2006.01)
*G06K 15/00* (2006.01)
*G06K 9/00* (2006.01)

(52) U.S. Cl. .................. 358/1.9; 358/518; 358/3.23; 358/522; 382/162; 382/167; 382/168

(58) Field of Classification Search .................. 358/1.9, 358/518, 523, 529, 3.23, 522; 382/168–172, 382/175–176, 165, 266, 199, 202–203, 162, 382/167; 399/189
See application file for complete search history.

(56) References Cited

U.S. PATENT DOCUMENTS

| | | | |
|---|---|---|---|
| 5,251,023 A | | 10/1993 | Arimoto et al. |
| 5,689,590 A | * | 11/1997 | Shirasawa et al. ............ 382/254 |
| 6,064,494 A | * | 5/2000 | Hirota et al. ................. 358/1.9 |
| 6,323,957 B1 | | 11/2001 | Ball |
| 6,389,162 B2 | * | 5/2002 | Maeda ........................ 382/172 |
| 6,816,196 B1 | * | 11/2004 | Mann ......................... 348/243 |
| 6,995,866 B2 | * | 2/2006 | Feng et al. ................... 358/1.9 |
| 7,102,786 B2 | * | 9/2006 | Takahashi et al. ............ 358/1.9 |
| 7,133,070 B2 | * | 11/2006 | Wheeler et al. .......... 348/223.1 |
| 2001/0012399 A1 | | 8/2001 | Tohyama et al. |
| 2003/0095134 A1 | * | 5/2003 | Tuomi et al. ................. 345/611 |

* cited by examiner

*Primary Examiner*—Edward L. Coles
*Assistant Examiner*—Charlotte M Baker

(57) ABSTRACT

A fast, low-memory-requiring, adaptive algorithm for determining and correcting for page background color generally involves quantizing the color component values of the pixels of the scanned page, dividing the scanned color space into a set of bins, and assigning each color in the scanned representation to a particular one of the bins to obtain a summary of the distribution of colors. Statistical information that is indicative color component characteristics of colors in a particular bin is collected for each bin. Using this information, each bin that constitutes a color peak is identified, and a region of influence for each color peak with respect to bins that are not color peaks is determined. The color peak corresponding to the background color of the document is then determined, according to predetermined rules that take into consideration the statistical information and region of influence determination. Three 1-D look-up tables are then constructed to adjust scanned colors.

17 Claims, 4 Drawing Sheets

FAST LOW-MEMORY PAPER COLOR SUPPRESSION ALGORITHM

BACKGROUND OF THE INVENTION

1. Field of the Invention

The present invention relates to a fast adaptive algorithm that determines and corrects for page background color. The algorithm has particular applicability in the context of color copiers. Embodiments of the algorithm may be realized as methods, various aspects/steps of which may be performed by an appropriately configured apparatus (e.g., a color copier). Additionally, a program of instructions (e.g., software) directing such apparatus to perform the methods or steps thereof may be embodied on a medium that is readable by the apparatus.

2. Description of the Related Art

One of the important problems to be addressed in the design of color copiers is the rendering of the page background color as white. Much of the content that users typically copy (e.g., magazine pages, etc.) is printed on paper that is of a light shade but not very white. A high-fidelity copy of such a page that also reproduces the color of the paper is often perceived to be of poorer quality than one that renders the background color of the paper white. In addition, most users do not want a copy that suffers from bleed-through artifacts, that is, printed matter from the reverse side of a copied page that is visible on the front side of the copy.

While methods exist to remove background noise and adjust background color, the present invention provides significant improvements in this technological area.

OBJECTS OF THE INVENTION

Accordingly, it is an object of the present invention to provide a fast adaptive algorithm that determines and corrects for page background color.

It is another object of this invention to provide such an algorithm that also minimizes the visibility of bleed-through artifacts particularly in page-background regions.

SUMMARY OF THE INVENTION

According to one aspect, this invention provides a method for determining and correcting for background color of a document. The method comprises: obtaining a digital representation of the document, the digital representation comprising a two-dimensional array of color elements, the color of each of which is specified by the combination of three color component values, the range of values of the color components defining a input color space containing a plurality of colors; quantizing the color component values of the color elements, dividing the input color space into a set of bins, each of which includes a subset of colors in the input color space, and assigning each color in the digital representation to a particular one of the bins to obtain a summary of the distribution of colors in the digital representation; obtaining, for each bin, statistical information that is indicative color component characteristics of colors in the bin; identifying each bin that constitutes a color peak based on at least some of the statistical information; determining a region of influence for each color peak with respect to bins that are not color peaks; determining the color peak corresponding to the background color of the document according to predetermined decision-making rules that take into consideration the statistical information and region of influence determination; and constructing a one-dimensional look-up table for each color component that correlates input color space values for that color component with corresponding output color space values.

Each of the color component values is represented by n-bits and the quantizing operation is preferably carried out by ignoring a select number of bits in the n-bit representation of each color component value.

Preferably, the statistical information stored for each bin are: pixel count, sum of the values of a first color component, sum of the values of a second color component, sum of the values of a third color component, sum of the squares of the values of the first color component, sum of the squares of the values of the second color component, and sum of the squares of the values of the third color component.

Preferably, the identifying step comprises declaring a given bin to be a peak if each of that bin's neighboring bins has a pixel count less than or equal to the given bin's pixel count.

Preferably, the region-of-influence determining step comprises deeming each peak to be in its own region of influence and deeming each of the non-peak-containing bins to be in the region of influence of the peak in a neighbor bin with the highest pixel count.

Preferably, the color-peak determining step comprises: assigning each peak-containing bin attributes, sorting the peaks into ordered sets corresponding to each of the attributes, defining constraints with respect to the background color peak, and of those peaks that satisfy all of the constraints, determining one of those peaks to be the background color peak, according to a set of predetermined decision-making rules.

Preferably, the constructing step comprises: determining a center value for the values of each color component based on the mean and standard deviation of the values of that color component computed over color elements belonging to the bin containing the background color peak, and determining a radius value for the values of each color component based on the standard deviation of the values of that color component computed over color elements belonging to the region of influence of the background color peak, the standard deviation of the values of that color component computed over color elements belonging to the bin containing the background color peak, and whether the bin with highest pixel count is the bin containing the background color peak.

In another aspect, the invention involves an apparatus, which is preferably a color copier. The apparatus comprises components/modules configured to carry out the processing described above. Such components/modules include a scanning module, and a processor, which itself may include a color histogram generating module and a color matching module.

In accordance with further aspects of the invention, the above-described method or any step thereof may be performed in response to execution of a program of instructions (e.g., software) by a computer, copier, or other processor-controlled device. Alternatively, the program of instructions may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The algorithm/technique of the present invention, which involves determining and correcting for page background color, has low memory requirements and use three one-dimensional color look-up tables (LUTs) to adjust scanned colors. A significant advantage of this invention is that computationally expensive three-dimensional color matching tables, matching scanner color to printer color coordinates, need not be recomputed for each scanned page.

Figure 1:
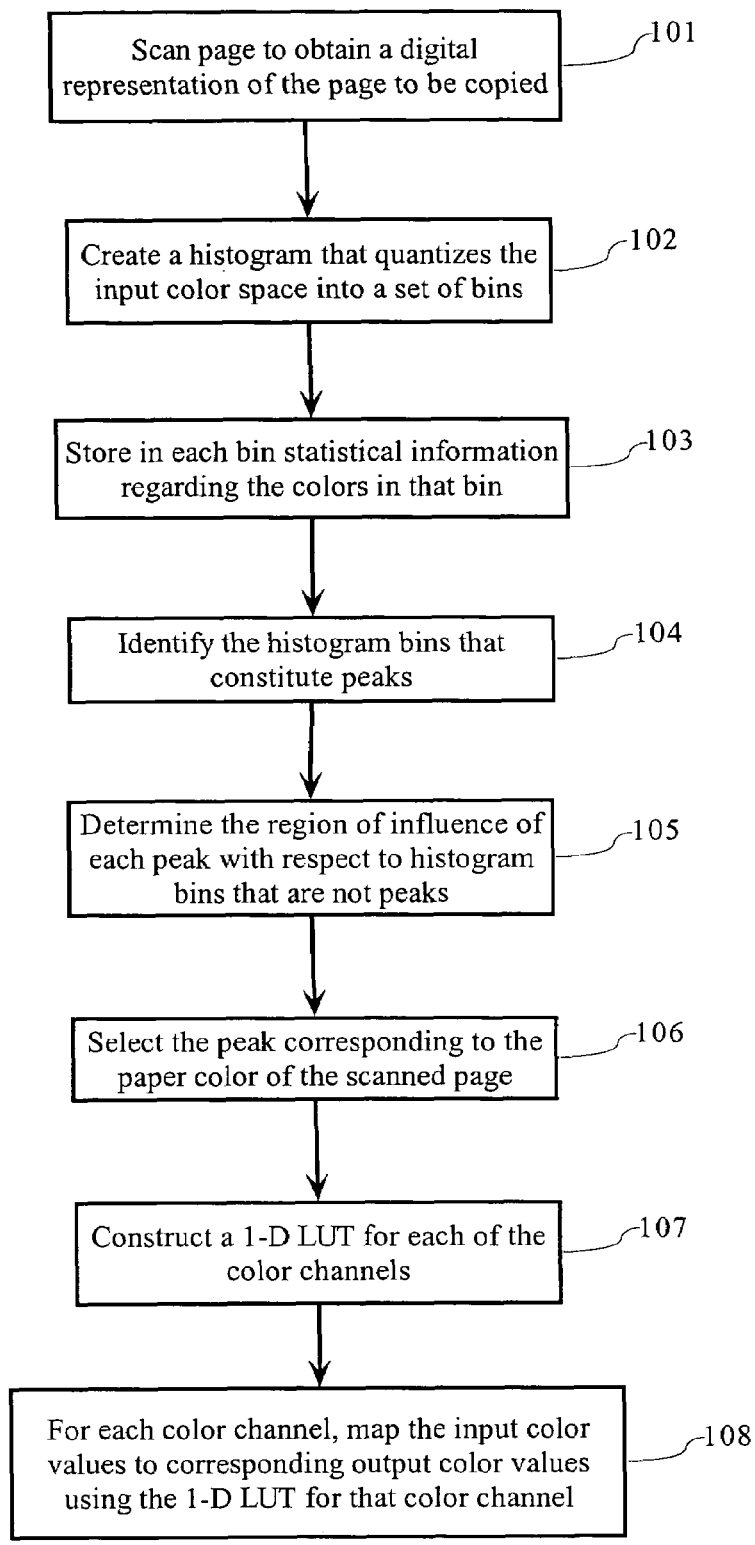
FIG. 1 is a flow chart illustrating processing operations of the page-background-color determining and correcting algorithm according to embodiments of the invention.

The processing involved in determining the color of the paper being copied (i.e., the background color) and estimating one-dimensional RGB color adjustment tables from the scanned page data are illustrated in the flow chart of FIG. 1. Initially, as part of the copy process, each page is digitized to generate a digital representation thereof that is comprised of a two-dimensional array of color elements (e.g., pixels), the color of each of which is specified by the combination of three color component values (step 101). This can be accomplished, for example, by scanning each page.

Having obtained a digital representation of a page to be copied, a summary of the distribution of colors in the representation is made using a histogram or equivalent mathematical model that quantizes the scanned color values, divides the input color space into a set of non-overlapping groups (bins), and stores the number of colors and per-color-component second-order statistics for each bin (steps 102 and 103). Quantization is performed by ignoring a selected number of least-significant bits in the numeric representation of each pixel. For example, if the scanned colors are represented in a 24-bit RGB space with 8 bits per color component or channel, one quantization approach would be to ignore, say, the 4 least-significant bits for each color component of each pixel and create a histogram with 16×16×16 bins. In this example, a scanned value of (r, g, b) would belong to the bin indexed by ($\lfloor r/16 \rfloor$, $\lfloor g/16 \rfloor$, $\lfloor b/16 \rfloor$). This is merely one exemplary quantization approach; other quantization approaches are possible. Moreover, note that, while in the above example the three color axes are each quantized to the same number of levels, this is not a requirement. Different levels may be used for the different color components.

A set of seven statistical numbers are stored for each histogram bin. Denoting the set of histogram bins as {$bin_k$: k=0, ..., number of bins}, the numbers stored for each bin are:

1. pixel count, $\Sigma_{(r,g,b)\in bin_k} 1$;
2. red sum, $\Sigma_{(r,g,b)\in bin_k} r$;
3. green sum, $\Sigma_{(r,g,b)\in bin_k} g$;
4. blue sum, $\Sigma_{(r,g,b)\in bin_k} b$;
5. red-squared sum, $\Sigma_{(r,g,b)\in bin_k} r^2$;
6. green-squared sum, $\Sigma_{(r,g,b)\in bin_k} g^2$; and
7. blue-squared sum, $\Sigma_{(r,g,b)\in bin_k} b^2$.

Returning to FIG. 1, after building the histogram for the scanned page data, peaks in the color distribution are identified in step 104. It is assumed that the background (i.e., paper color) is one of the color peaks. If the scanned data is completely confined within the page boundaries, that is, none of the digital data corresponds to extraneous material (e.g., the backplane of the scanner), it is reasonable to assume that the lightest color peak corresponds to the paper color (assuming non-fluorescent inks). However, if a portion of digital data includes the scanner backplane, the lightest regions may be due, at least in part, to contribution by this scanner component. Thus, the lightest peak by itself is not a reliable indicator of the paper color. Accordingly, the present invention employs a combination of the color peaks obtained from the page histogram and region-of-influence criteria for determining the peak corresponding to the paper color of that page.

The histogram peaks are determined by a steepest descent greedy search algorithm for each histogram bin. A histogram bin is a peak if all of its neighbor bins have pixel counts less than or equal to its own pixel count. Given that each bin is in effect a volume cell within the input color space, the number of neighbors a given bin can have depends on the definition of adjacency or connectivity used. In a 6-connected neighborhood two bins are neighbors if they share a face; in an 18-connected neighborhood two bins are neighbors if they share a face or an edge; and in a 26-connected neighborhood two bins are neighbors if they share a face, an edge, or a vertex. Preferably, a 26-connected neighborhood is used in this invention, that is, each bin is compared with its 26 neighboring bins.

The greedy search technique also assigns histogram bins to potentially overlapping sets referred to as regions of influence (step 105).

The role of the region of influence of a peak in determining paper color is motivated by the following. Consider a simple document containing some black text. One would expect to see two color peaks, one for the paper (background) color and one for the text. If the scanner backplane is visible in the scan, a third peak corresponding to the backplane color should be visible. Due to scanner blur, one would expect to see colors that lie along paths connecting the color peaks due to color mixing between regions that share edges. Since the paper background shares edges with both the text and backplane regions, it should form a "hub" with color paths connecting both regions. Extending this idea to a document with multiple colors, the paper color is assumed to be the center of the largest hub connecting various color peaks corresponding to the dominant colors in the scanned page. Bleed-thru colors in the background regions correspond to mixtures of the paper color with other colors. Thus, if similar colors appear on both the front and reverse sides of a page, the paper-color region of influence would include bleed-thru colors.

The region of influence of a histogram peak is determined as follows. Every peak is in its own region of influence. All other histogram bins are assigned to one of the peaks as follows. If a histogram bin is not a peak, it is assigned to the peak to which its neighbor bin with the largest pixel count is assigned. Typically, peak assignments are propagated using the 26-connected neighborhood. In the event of ties, the subject bin is preferably assigned to all peaks in the tie and belongs to all of the corresponding regions of influence. Alternate strategies for tie resolution that may be used include randomly choosing from among competing peaks, or choosing the peak closest to the subject bin.

Figure 2:
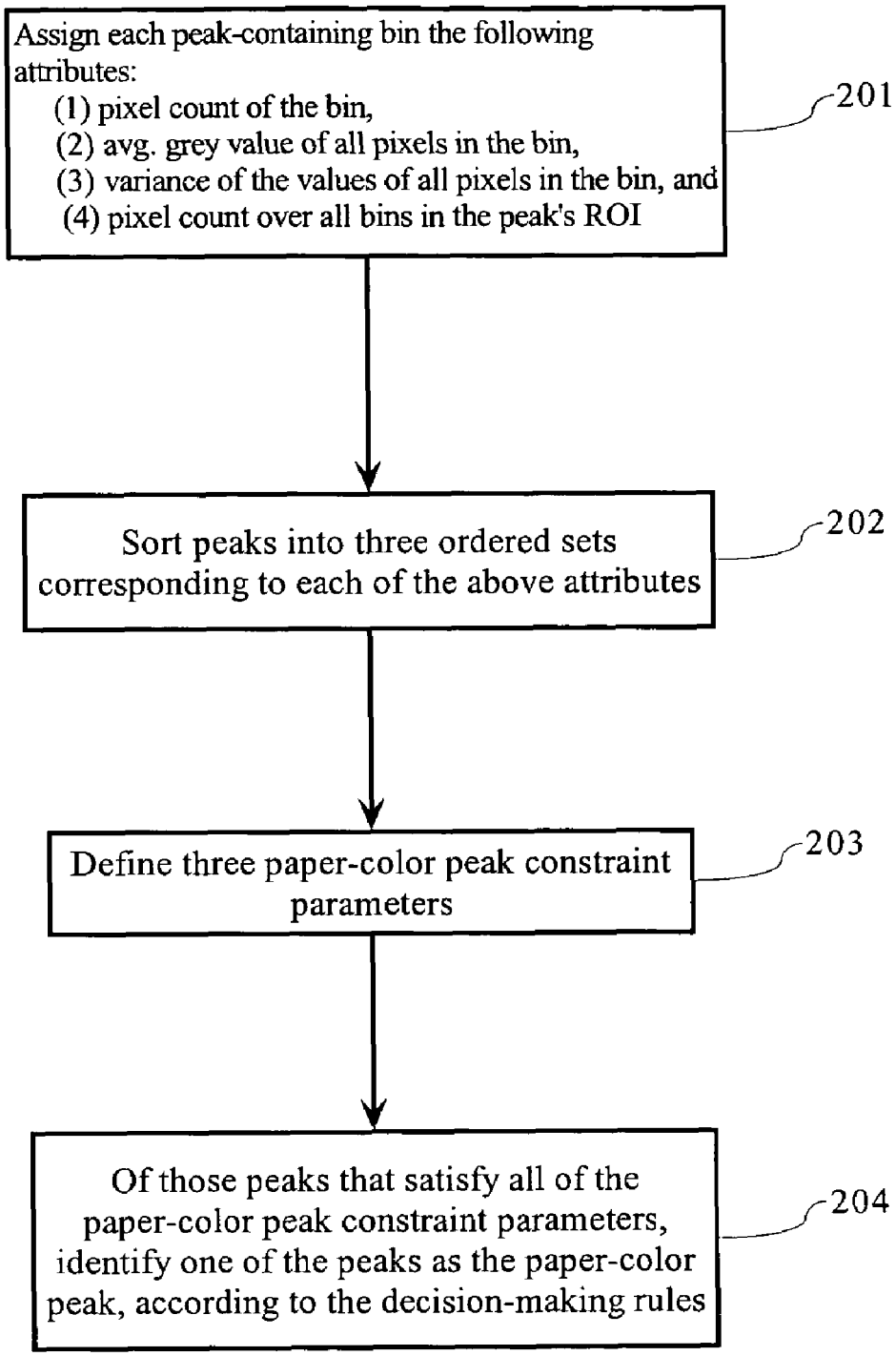
FIG. 2 is a flow chart illustrating processing operations involved in the determination of the color peak corresponding to the page background color.

After determining the peaks and regions of influence, the next step (step 106) is to select the peak corresponding to the paper color of the scanned page. Referring to the flow chart of FIG. 2, in which this step is illustrated in more detail, it can be seen that the paper-color-peak selection process initially involves, as indicated in step 201, assigning each peak the following attributes:

1. pixel count of the bin corresponding to the peak,
2. average grey value of all pixels in the corresponding bin,
3. variance of the values of all pixels in the corresponding bin, and
4. pixel count over all bins that are in the peak's region of influence.

The set of peaks is then sorted into three ordered sets corresponding to each of the above attributes (step 202).

To capture prior information regarding paper color, three constraint parameters are defined in step 203. These constraints are: (1) minimum average lightness of pixels in the paper-color bin, (2) maximum saturation for the mean color of the paper-color bin, and (3) minimum pixel count for the paper-color bin.

Of the paper-color candidate peaks, that is, of the peaks within bins that satisfy all three of the above constraints, the best candidate for the paper color is chosen according to the decision-making rules set forth below (step 204). Most of the time, the peak corresponding to the lightness average grey value will be selected as the paper color peak. However, if another peak has both the largest bin and region-of-influence pixel counts, it is chosen as the best candidate over the lightest peak, provided no other lighter peaks violate the paper-color constraint for color saturation (this case addresses the situation when a lighter scanner backplane is visible in the scan). The chosen candidate must satisfy all three paper-color constraints before it is identified as the paper-color peak.

Returning to FIG. 1, after a paper-color peak is identified, three one-dimensional look-up tables (LUTs) corresponding to the R, G and B color channels, respectively, are independently constructed (step 107). By way of example, construction of the LUT for the red channel is described. A LUT for each of the green and blue channels is constructed in a similar manner. Let $\mu_R^{paper\ bin}$ and $\sigma_R^{paper\ bin}$ respectively denote the mean and standard deviation of the red channel computed over pixels belonging to the bin designated as the paper-color peak. Let $\sigma_R^{paper\ ROI}$ denote the standard deviation of the red channel computed over all pixels belonging to the region of influence of the paper-color peak. Also, let max Bin denote the bin with the largest pixel count and max ROI denote the peak containing the maximum number of pixels in its region of influence. Using the quantities center and radius parameters are defined as follows:

$$\text{center} = \mu_R^{paper\ bin} - \alpha \sigma_R^{paper\ bin} \text{ and,} \quad (1)$$

$$\text{radius} = \begin{cases} \beta \sigma_R^{paper\ ROI} & \text{if max} ROI = \text{paper bin} \\ \beta \sigma_R^{paper\ bin} & \text{otherwise,} \end{cases} \quad (2)$$

where $\alpha$ and $\beta$ are predefined factors typically assigned values between 1.0 and 3.0.

With the center and radius defined as above, each input value r is mapped to an output value $\hat{r}$ according to the following equation:

$$\hat{r} = \begin{cases} R_{\max} * \gamma + (1-\gamma)r & \text{if } r < \text{center} \\ R_{\max} & \text{if } r \geq \text{center} \end{cases} \quad (3)$$

where, $$\gamma = e^{\left\{\frac{-(r-center)^2}{2 \times radius^2}\right\}} \quad (4)$$

In equations (3) and (4), the values of r and $\hat{r}$ are assumed to lie in the range of 0 to $R_{max}$.

As noted above, a similar procedure is undertaken to construct a one-dimensional LUT for each of the green and blue channels, that is, to construct a green channel LUT that maps each input value g to a corresponding output value $\hat{g}$ and to construct a blue channel LUT that maps each input value b to a corresponding output value $\hat{b}$.

Figure 3:
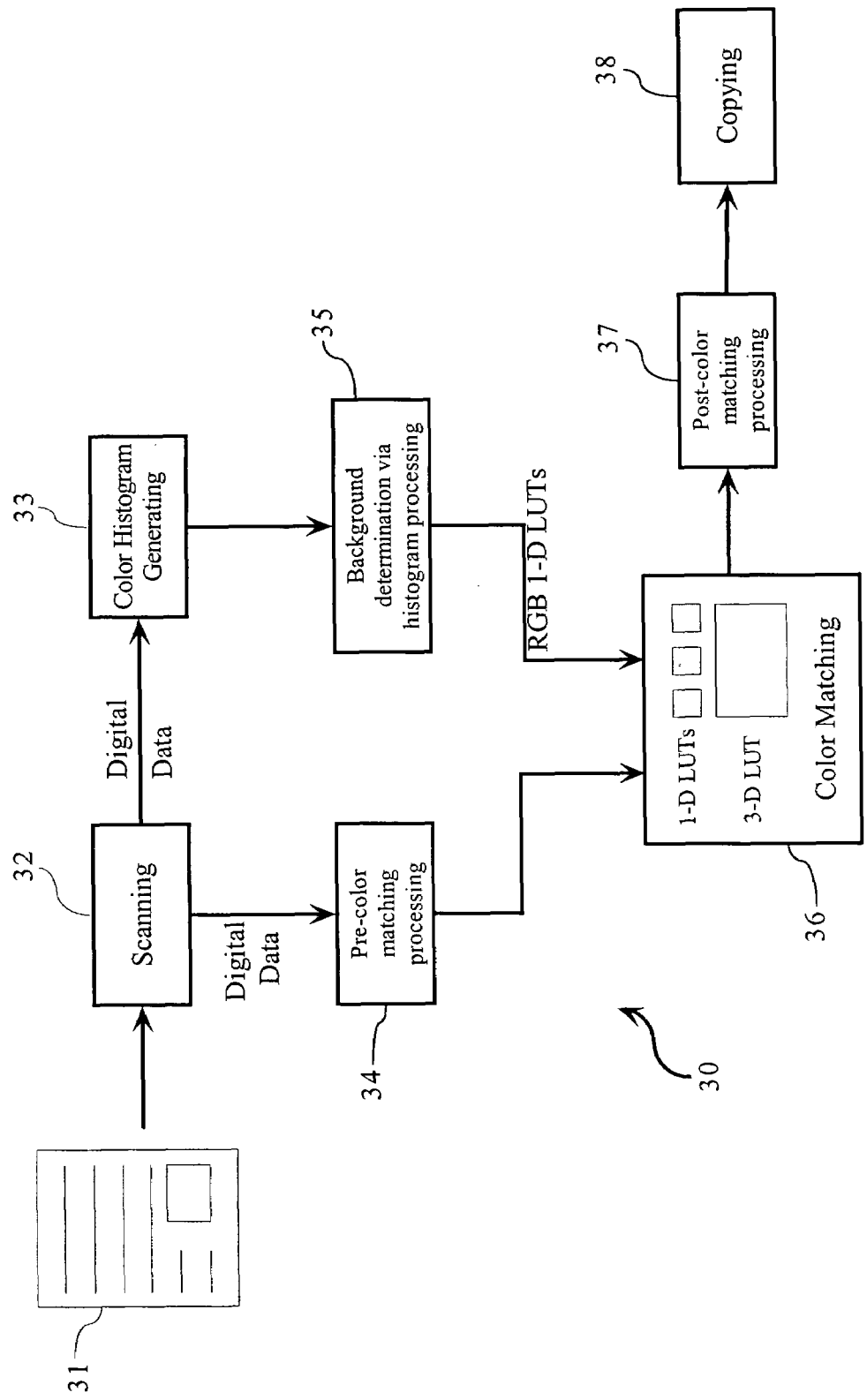
FIG. 3 is a functional block diagram that illustrates a system for performing the algorithm and further shows the interrelationship between the processing operations.

Having described embodiments of the paper color suppression algorithm, the discussion now turns to a system for implementing the algorithm. Referring to FIG. 3, in which the functional aspects of such a system 30 are illustrated, a to-be-copied page 31 with a non- or off-white background from, say, a magazine is scanned, as indicated in module 32, to generate a digital representation of the page content. The page may contain text, image and/or graphics. The digital data representing the page content is then transmitted to a module 33 that generates a color histogram for the page content as explained above. The digital data is also sent to a module 34 that performs known pre-color matching processing as part of the copy process. The color histogram generated by module 33 is processed to determine the background color of the scanned page and to generate the 1-D LUTs as described above. The histogram processing is represented by module 35. These LUTs are transmitted to a color matching module 36, along with the output of the pre-color matching process. The color matching module 36 uses the 1-D LUTs to generate a 3-D LUT matching the scanner RGB colors to printer/copier coordinates. As previously noted, a significant advantage of this invention is that the 3-D color matching LUT, which is computationally expensive, need not be recomputed for each scanned image.

Additional post-color matching processing is typically performed, as indicated by module 37, before a copy or print of the scanned page is generated in module 38.

It should be noted that all of the processing represented by these modules may, and preferably are, integrated into a single device, e.g., a copier. While this is the preferred environment of the invention, it is by no means the only arrangement. For example, the scanning function 32 may be performed in a separate device (e.g., a scanner) that is communication with a copier in which the other functions are performed. Still other arrangements are possible, as one skilled in the art will recognize.

Figure 4:
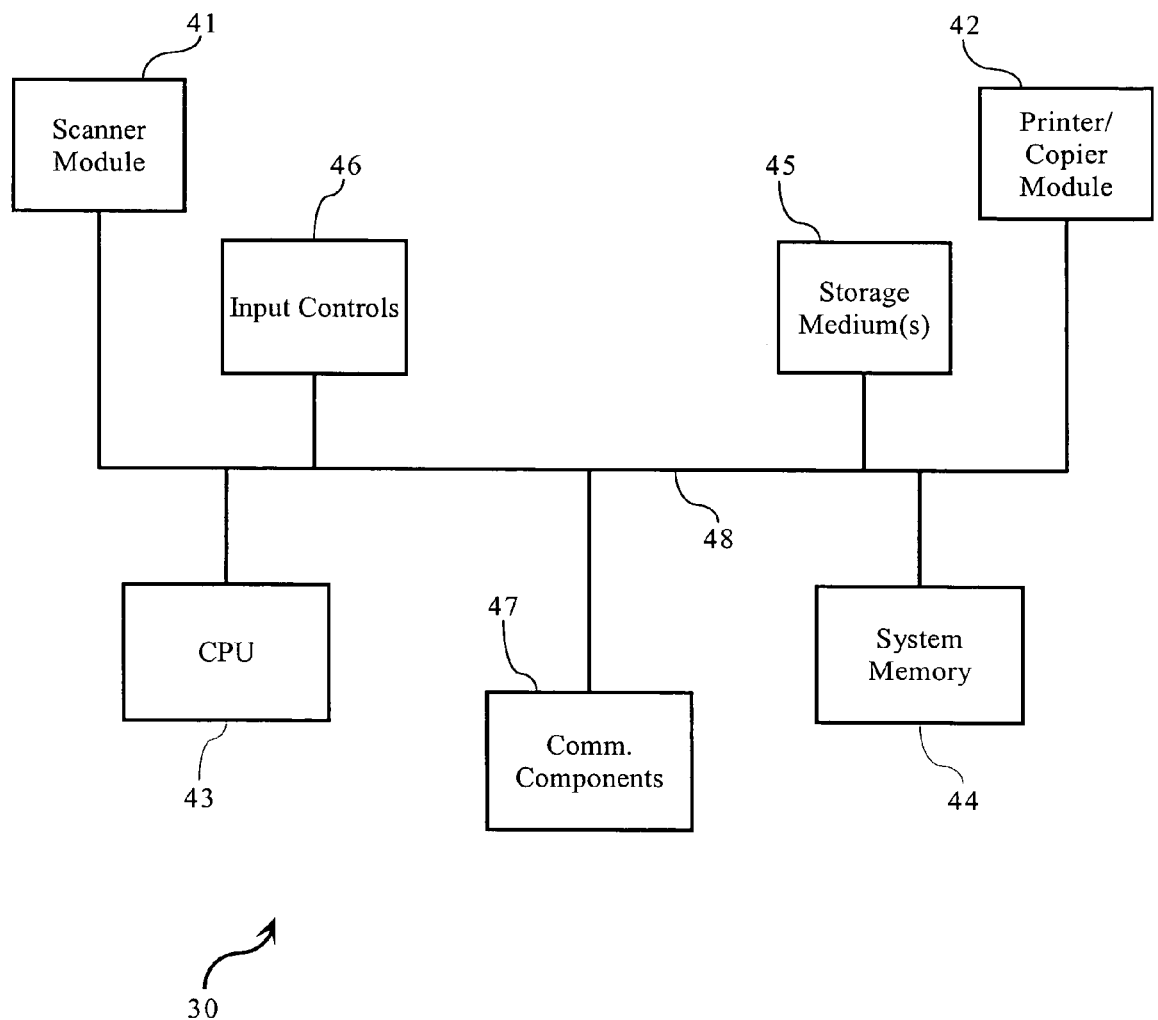
FIG. 4 is a block diagram of a system for performing the algorithm.

FIG. 4 as a block diagram of system 30 configured as a single device in which all of the above-described functions are performed. System 30 comprises a scanner module 41 and a print/copy module 42. The system further includes a central processing unit (CPU) 43 that provides computing resources for scanner 41 and printer/copier 42 and controls other aspects of the system as well. CPU 43 may be implemented with any suitable microprocessor or the like and may include auxiliary chips to assist with certain functions. System memory 44 which may be in the form of random-access-memory (RAM) and read-only-memory (ROM) is also provided. A storage medium 45 may be used to record programs of instructions for operating systems, utilities and/or applications, which may include embodiments of programs that implement various aspects of the present invention. Storage medium 45 may also be used to store scanned data of the page content.

The system 30 will typically also include appropriate input controls 46 which will vary depending on the environment in which the invention is employed and the components used. In the integrated copy/print device which system 30 depicts, the input controls may be in the form of a keypad.

System 30 can also include external communication components 47 that can communicate with external devices to send and receive information (i.e., programs and data) including data to be printed/copied in accordance with this invention. To this end, external communication components 48 typically include components to connect to remote devices through any of a variety of networks (wired or wireless) including the Internet, a local or wide area network, or through any suitable electromagnetic carrier signals including infrared signals. Finally, it should be noted that each such module or component in FIG. 4 includes a controller for interfacing with other major system components which are connected through a bus 48 which may represent more than one physical bus.

As will be appreciated from the foregoing, the present invention provides a fast low-memory algorithm for determining and adjusting background page color, and generating 1-D LUTs for adjusting the scanned colors in accordance with the background determination. The algorithm may be embodied in a variety of different environments, as explained above. Within any of those environments, the algorithm may be implemented as software that controls the functions of appropriate hardware involved in the processing. The equivalent of software-based instructions may also be realized, for example, using ASIC(s), or the like, which have instructions embodied therein. As such, the claim language "device-readable medium" includes not only software-carrying media, but also hardware having instructions for performing the required processing hardwired thereon, as well as a combination of hardware and software. Similarly, the claim language "program of instructions" includes both software and instructions embedded on hardware. Also, "module" as used in the claims covers any appropriately software and/or hardware that is capable of performing the functions recited. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for determining and correcting for background color of a document, comprising:
   obtaining a digital representation of the document, the digital representation comprising a two-dimensional array of color elements, the color of each color element is specified by a combination of three color component values, the range of values of the color components defining an input color space containing a plurality of colors;
   quantizing the color component values of the color elements, dividing the input color space into a set of bins, each of which includes a subset of colors in the input color space, each color specified by the combination of three color component values, and assigning each color in the digital representation to a particular one of the bins to obtain a summary of the distribution of colors in the digital representation;
   obtaining, for each bin, statistical information that is indicative of the three color component characteristics of the colors in each bin;
   identifying each bin that constitutes a color peak based on at least some of the statistical information;
   determining a region of influence for each color peak with respect to bins that are not color peaks;
   determining the color peak corresponding to the background color of the document according to predetermined decision-making rules that take into consideration the statistical information and region of influence determination; and
   constructing a one-dimensional look-up table for each color component that correlates input color space values for that color component with corresponding output color space values.

2. A method as recited in claim 1, wherein each of the color component values is represented by n-bits and the quantizing operation is carried out by ignoring a select number of bits in the n-bit representation of each color component value.

3. A method as recited in claim 1, wherein the statistical information stored for each bin are: pixel count, sum of the values of a first color component, sum of the values of a second color component, sum of the values of a third color component, sum of the squares of the values of the first color component, sum of the squares of the values of the second color component, and sum of the squares of the values of the third color component.

4. A method as recited in claim 1, wherein the identifying step comprises declaring a given bin to be a peak if each of that bin's neighboring bins has a pixel count less than or equal to the given bin's pixel count.

5. A method as recited in claim 1, wherein the region-of-influence determining step comprises deeming each peak to be in its own region of influence and deeming each of the non-peak-containing bins to be in the region of influence of the peak in a neighbor bin with the highest pixel count.

6. A method as recited in claim 1, wherein the color-peak determining step comprises:
   assigning each peak-containing bin attributes,
   sorting the peaks into ordered sets corresponding to each of the attributes,
   defining constraints with respect to the background color peak, and
   of those peaks that satisfy all of the constraints, determining one of those peaks to be the background color peak, according to a set of predetermined decision-making rules.

7. A method as recited in claim 1, wherein the constructing step comprises:
   determining a center value for the values of each color component based on the mean and standard deviation of the values of that color component computed over color elements belonging to the bin containing the background color peak, and
   determining a radius value for the values of each color component based on the standard deviation of the values of that color component computed over color elements belonging to the region of influence of the background color peak, the standard deviation of the values of that color component computed over color elements belonging to the bin containing the background color peak, and whether the bin with highest pixel count is the bin containing the background color peak.

8. An apparatus for determining and correcting for background color of a document, comprising:
a scanning module configured to obtain a digital representation of the document, the digital representation comprising a two-dimensional array of color elements, the color of each color element is specified by a combination of three color component values, the range of values of the color components defining an input color space containing a plurality of colors; and
a processor configured to:
quantize the color component values of the color elements, divide the input color space into a set of bins, each of which includes a subset of colors in the input color space, each color specified by the combination of three color component values, and assign each color in the digital representation to a particular one of the bins to obtain a summary of the distribution of colors in the digital representation,
obtain, for each bin, statistical information that is indicative of the three color component characteristics of the colors in each bin,
identify each bin that constitutes a color peak based on at least some of the statistical information,
determine a region of influence for each color peak with respect to bins that are not color peaks,
determine the color peak corresponding to the background color of the document according to predetermined decision-making rules that take into consideration the statistical information and region of influence determination, and
construct a one-dimensional look-up table for each color component that correlates input color space values for that color component with corresponding output color space values.

9. An apparatus as recited in claim 8, wherein the processor includes a color histogram generating module.

10. An apparatus as recited in claim 9, wherein the processor further includes a color matching module.

11. A device-readable medium carrying a program of instructions for directing a machine to perform a method of determining and correcting for background color of a document, the program of instructions comprising:
instructions for obtaining a digital representation of the document, the digital representation comprising a two-dimensional array of color elements, the color of each color element is specified by a combination of three color component values, the range of values of the color components defining an input color space containing a plurality of colors;
instructions for (i) quantizing the color component values of the color elements, (ii) dividing the input color space into a set of bins, each of which includes a subset of colors in the input color space, each color specified by the combination of three color component values, and (iii) assigning each color in the digital representation to a particular one of the bins to obtain a summary of the distribution of colors in the digital representation;
instructions for obtaining, for each bin, statistical information that is indicative of the three color component characteristics of the colors in each bin;
instructions for identifying each bin that constitutes a color peak based on at least some of the statistical information;

instructions for determining a region of influence for each color peak with respect to bins that are not color peaks;
instructions for determining the color peak corresponding to the background color of the document according to predetermined decision-making rules that take into consideration the statistical information and region of influence determination; and
instructions for constructing a one-dimensional look-up table for each color component that correlates input color space values for that color component with corresponding output color space values.

12. A device-readable medium as recited in claim 11, wherein each of the color component values is represented by n-bits and the quantizing operation is executed by ignoring a select number of bits in the n-bit representation of each color component value.

13. A device-readable medium as recited in claim 11, wherein the statistical information stored for each bin are: pixel count, sum of the values of a first color component, sum of the values of a second color component, sum of the values of a third color component, sum of the squares of the values of the first color component, sum of the squares of the values of the second color component, and sum of the squares of the values of the third color component.

14. A device-readable medium as recited in claim 11, wherein the identifying instructions comprise instructions for declaring a given bin to be a peak if each of that bin's neighboring bins has a pixel count less than or equal to the given bin's pixel count.

15. A device-readable medium as recited in claim 11, wherein the region-of-influence determining instructions comprise instructions for deeming each peak to be in its own region of influence and deeming each of the non-peak-containing bins to be in the region of influence of the peak in a neighbor bin with the highest pixel count.

16. A device-readable medium as recited in claim 11, wherein the color-peak determining instructions comprise:
instructions for assigning each peak-containing bin attributes,
instructions for sorting the peaks into ordered sets corresponding to each of the attributes,
instructions for defining constraints with respect to the background color peak, and
of those peaks that satisfy all of the constraints, instructions for determining one of those peaks to be the background color peak, according to a set of predetermined decision-making rules.

17. A device-readable medium as recited in claim 11, wherein the constructing instructions comprise:
instructions for determining a center value for the values of each color component based on the mean and standard deviation of the values of that color component computed over color elements belonging to the bin containing the background color peak, and
instructions for determining a radius value for the values of each color component based on the standard deviation of the values of that color component computed over color elements belonging to the region of influence of the background color peak, the standard deviation of the values of that color component computed over color elements belonging to the bin containing the background color peak, and whether the bin with highest pixel count is the bin containing the background color peak.

* * * * *